US008270792B1

(12) United States Patent
Ng (10) Patent No.: US 8,270,792 B1
(45) Date of Patent: Sep. 18, 2012

(54) HIGH-RESOLUTION MULTI-LEVEL FREQUENCY CHANNELIZERS

(75) Inventor: Willie W. Ng, Agoura Hills, CA (US)

(73) Assignee: HRL Laboratories, LLC, Maibu, CA (US)

( * ) Notice: Subject to any disclaimer, the term of this patent is extended or adjusted under 35 U.S.C. 154(b) by 557 days.

(21) Appl. No.: 12/560,409

(22) Filed: Sep. 15, 2009

(51) Int. Cl.
G02B 6/26 (2006.01)
H04J 14/00 (2006.01)

(52) U.S. Cl. ............... 385/48; 385/14; 385/42; 385/24; 385/31; 398/53; 398/68; 398/69

(58) Field of Classification Search .................... 385/14, 385/24, 15, 27, 31, 42, 48, 49, 129, 130, 385/131, 132; 398/53, 68, 69, 83, 101, 102
See application file for complete search history.

(56) References Cited

U.S. PATENT DOCUMENTS

| 5,327,215 | A | 7/1994 | Bernard et al. | |
| 5,414,548 | A * | 5/1995 | Tachikawa et al. | 398/87 |
| 6,185,345 | B1 * | 2/2001 | Singh et al. | 385/24 |
| 6,668,006 | B1 | 12/2003 | Margalit et al. | |
| 6,681,065 | B1 * | 1/2004 | Minasian et al. | 385/27 |
| 6,724,512 | B2 * | 4/2004 | Carlson et al. | 359/244 |
| 7,085,438 | B2 * | 8/2006 | Mizuno et al. | 385/3 |
| 7,190,858 | B1 * | 3/2007 | Greiner et al. | 385/37 |
| 7,509,048 | B2 * | 3/2009 | Turpin et al. | 398/83 |
| 8,019,185 | B2 | 9/2011 | Yap | |
| 2005/0286602 | A1 | 12/2005 | Gunn et al. | |
| 2006/0083456 | A1 | 4/2006 | Burns et al. | |
| 2006/0215949 | A1 | 9/2006 | Lipson et al. | |
| 2007/0009205 | A1 | 1/2007 | Maleki et al. | |
| 2009/0208209 | A1 | 8/2009 | Ng et al. | |

OTHER PUBLICATIONS

Alfred Driessen et al., "Microresonators as promising building blocks for VLSI photonics," Integrated Optics: Theory and Applications, edited by Pustelny et al., Proc. of SPIE vol. 5956, 59560Q, 2005, Warsaw, Poland.
U.S. Appl. No. 12/763,965 to Ng et al., pending, unpublished (filed Apr. 20, 2010), commonly assigned with present patent application.

* cited by examiner

Primary Examiner — Brian Healy
(74) Attorney, Agent, or Firm — Oconnor & Company (57) ABSTRACT

In some variations, the present invention provides a method for forming a chip-scale photonic frequency channelizer or spectrum analyzer. A low-loss waveguide forms a long delay-line in a first level, from which a large number of filter-taps form narrow channel passbands. Multi-dimensional laser-written waveguides feed a slab waveguide coupler located at a stacked, second level. A chip-scale RF-photonic spectrum analyzer provided by this invention has extremely high resolution, such as a passband width of about 30 MHz over a free spectral range of 12 GHz, while occupying a device footprint of only about 10 $cm^2$ area.

28 Claims, 5 Drawing Sheets

HIGH-RESOLUTION MULTI-LEVEL FREQUENCY CHANNELIZERS

FIELD OF THE INVENTION

The present invention relates generally to frequency channelization, and specifically to high-resolution frequency channelizers and spectrum analyzers.

BACKGROUND OF THE INVENTION

The ever-increasing demand for broadband communication systems has led to optical-transmission systems based on optical waveguides such as fiber optics and optical-processing elements. Generally, in high-performance communication systems, photons continue to supplant electrons as messengers. In defense-related systems, one can encounter threats over a broad spectrum of radio frequencies. The systems need to cover the spectrum with sufficient selectivity to separate simultaneously received signals that are closely spaced in frequency. These requirements can be met through frequency channelization.

Optical wavelengths (or frequencies) can be separated (de-multiplexed) or recombined (multiplexed) through physical phenomena known as refraction and diffraction. Many multiplexers (mux) and de-multiplexers (demux) in current use, such as arrayed waveguide gratings (AWGs) mux/demux occupy a large footprint because a large number of distinct waveguide delay-lines (phasar arms) need to be integrated, so that an optical phased array can be formed on a chip. Specifically, the array of phasar delay-lines plays an analogous role as a diffraction grating (e.g., in a spectrometer) in setting the conditions of constructive interference for each incident wavelength. After passage through the phasar arms, the incident wavelengths can be demultiplexed because optical interference causes their phase fronts to propagate in different directions. The wavelength resolution ($\delta\lambda$) of an AWG mux or demux is inversely proportional to the number of phasar arms in the optical phased array. Hence, high channelization resolution is achieved by integrating a large number of phasar arms on the AWG chip.

Other de-multiplexers include traditional dispersive devices, such as diffraction gratings and prisms. While simpler in fabrication and less expensive than AWGs, these devices typically have lower resolution and have a form factor that is too large for insertion in fiber optic links. Because of their operational dependence on free-space optics, these devices are also very sensitive to temperature and generally to vibration/shock, making them unsuitable for insertion or deployment in a fiber optic link.

In conventional frequency channelizers, optical spectrum analyzers (e.g., AWG demux) of the finite impulse response (FIR) design use an array of waveguides (phasar arms) to generate differential phase-shifts that enable different optical frequencies to be focused to distinct output ports lying on an output arc of a planar waveguide coupler, i.e., a slab waveguide coupler.

For example, the passband width and channel spacing of a conventional silica AWG de-multiplexer are typically 0.3 nm (37.5 GHz) and 0.4 nm (50 GHz), respectively. These known AWGs use an array of distinct phasar arms to generate the differential phase-shifts that resolve an incident spectrum. Such a design leads to relatively large chip sizes, such as 30 $cm^2$ or more for 64 channels.

In view of the above-described shortcomings, new methods and design methodologies are needed to provide effective RF-photonic frequency channelizers with reduced chip sizes, such as (for example) 10 $cm^2$ or less. Typically, the fluctuations of optical phase (such as those due to temperature variations) increase with the footprint of the device; therefore, smaller devices would be beneficial for improved stability as well as for practical reasons.

Improved frequency channelizers should also have high resolution, such as the capability to channelize an input optical signal into channels having a passband width of less than 100 MHz, such as 50 MHz or less, and preferably 30 MHz or less.

SUMMARY OF THE INVENTION

The present invention addresses the aforementioned needs in the art, as will now be summarized and further described in detail below.

In some variations, this invention provides an apparatus for frequency channelization, the apparatus comprising:

(a) an input for receiving a multi-frequency optical signal and a single delay-line for propagating the optical signal;

(b) a first waveguide layer comprising a first waveguide and a second waveguide layer comprising a second waveguide;

(c) in the first waveguide layer, a plurality of filter-taps from the single delay-line;

(d) in the second waveguide layer, a slab waveguide coupler with output ports for spatially separating signals from the filter-taps; and (e) an optical interconnect traversing from the first waveguide layer to the second waveguide layer, wherein the optical interconnect guides signals from the filter-taps to the slab waveguide coupler.

In some embodiments, the first waveguide layer and the second waveguide layer are substantially co-planar. Optionally, additional waveguide layers are present in a stacked configuration. In preferred embodiments, the first waveguide exhibits a loss of less than 1 dB/m at a wavelength of 1550 nm.

The materials for the first and second waveguide can be independently selected. In some embodiments, the first waveguide consists essentially of silica, optionally with one or more dopants. The second waveguide can also consist essentially of silica, optionally with one or more dopants.

Preferably, the filter-taps include in-plane directional couplers. In preferred embodiments of the invention, the filter-taps are apodized and provide differential phase-shifts from a single, serpentine delay-line. The apparatus can include many filter-taps, such as (for example) 100 filter-taps or more.

In some embodiments, the optical interconnect is formed by translating a focal point of a laser beam from the first waveguide layer to the second waveguide layer, thereby generating regions of material with increased optical refractive index. The laser beam can be in the UV region or the near-IR region, for example.

In some variations, this invention provides an apparatus for frequency channelization, the apparatus comprising:

(a) an input for receiving a multi-frequency optical signal and a single delay-line for propagating the optical signal;

(b) a first waveguide layer comprising a first waveguide and a second waveguide layer comprising a second waveguide;

(c) in the first waveguide layer, a plurality of filter-taps from the delay-line;

(d) in the second waveguide layer, a slab waveguide coupler with output ports for spatially separating signals from the filter-taps; and (e) an optical interconnect traversing from the first waveguide layer to the second waveguide layer, wherein the optical interconnect guides signals from the filter-taps to the slab waveguide coupler, the apparatus comprising a sufficient number of filter-taps whereby the multi-frequency optical signal is resolved into a plurality of spectral regions of about 100 MHz or less.

Preferably, the first waveguide exhibits a loss of less than 1 dB/m at a wavelength of 1550 nm. Silica (with or without dopants) can be desirable for this purpose.

In some embodiments, the apparatus comprises a sufficient number of filter-taps whereby the multi-frequency optical signal is resolved into a plurality of spectral regions of about 50 MHz or less, such as 30 MHz or less.

The optical interconnect be laser-written. For example, the optical interconnect can be effectively formed by translating a focal point of a laser beam from the first waveguide layer to the second waveguide layer, thereby generating regions of material with increased optical refractive index.

In some embodiments, the apparatus further includes a local-oscillator arm for feeding a local-oscillator signal with no RF-modulation into the center input port of the slab waveguide coupler. The local-oscillator arm can distribute the local-oscillator signal to the output ports to recover the original RF-modulation from the output ports of the slab waveguide coupler.

Other variations of the invention relate to methods. In some variations, a method is provided for channelizing an input optical signal, the method comprising:

(a) receiving a multi-frequency optical signal and propagating the optical signal onto a single delay-line in a first layer;

(b) tapping optical power from the delay-line at a plurality of filter-taps, each filter-tap comprising a co-planar directional coupler in the first layer; and (c) guiding, through an optical interconnect, optical power tapped in step (b) to a slab waveguide coupler in a second layer, wherein the slab waveguide coupler includes output ports.

The filter-taps are preferably (but not necessarily) fabricated simultaneously with the delay-line. The filter-taps are preferably apodized. The output ports in the slab waveguide coupler for channelize the optical power.

In some embodiments, the optical interconnect is formed by translating a focal point of a laser beam from a filter-tap to a slab waveguide coupler, thereby generating a region with increased optical refractive index.

Certain methods include a sufficient number of filter-taps so that the multi-frequency optical signal is resolved into a plurality of spectral regions of about 50 MHz or less, such as 30 MHz or less.

In some embodiments, the method includes introducing a local-oscillator signal at the center port of the input arc of the slab waveguide coupler to recover, by photodetection, the RF-modulation of the input optical signal.

Another variation of the invention describes a method of writing an optical interconnect between a first waveguide layer and a second waveguide layer, the method comprising translating a focal point of a laser beam from the first waveguide layer to the second waveguide layer, thereby generating regions of material with changed (preferably increased) optical refractive index.

A suitable laser beam can be in the UV region or the near-IR region. In some embodiments, the laser beam is pulsed with a pulse width selected from about 10-1000 fs, e.g. about 100-500 fs. This method of writing an optical interconnect enables the formation of one or more three-dimensional optical interconnects, which can be useful when the first and second waveguide layers are stacked.

DETAILED DESCRIPTION OF EMBODIMENTS OF THE INVENTION

The apparatus and methods of the present invention will now be described in detail by reference to various non-limiting embodiments of the invention.

Unless otherwise indicated, all numbers expressing dimensions, frequencies, efficiencies, and so forth used in the specification and claims are to be understood as being modified in all instances by the term "about." Without limiting the application of the doctrine of equivalents to the scope of the claims, each numerical parameter should at least be construed in light of the number of significant digits and by applying ordinary rounding techniques.

In some variations, this invention provides an approach for fabricating photonic-frequency channelizers, such as radio-frequency (RF) channelizers or spectrum analyzers, formed on multiple layers of waveguides. "Channelization" refers to the filtering or division of a broadband signal into narrower frequency-bands, or channels. In some embodiments, a frequency channelizer of the invention will enable multi-GHz signals modulated on an optical carrier to be resolved into spectral windows as fine as 30 MHz. The invention is suitable for a broad electromagnetic spectrum, such as (but not limited to) 0.1-12 GHz.

According to the present invention, filter-taps can provide differential phase-shifts from a single low-loss silica waveguide (WG). To maintain phase stability, two stacked waveguide layers are preferably employed to form a chip-scale frequency channelizer. In some embodiments, a first WG level contains a low-loss waveguide, while a second WG level includes a coupler formed from a two-dimensional waveguide, such as (for example) a slab-coupler designed with output ports.

It is important to effectively connect filter-taps derived from the waveguide in the first level to the slab coupler of the second level. In preferred embodiments, such connection is achieved with a three-dimensional optical interconnect. Preferably, accurate filter-taps are formed via co-planar coupling at the first waveguide level. In preferred embodiments, a high side-lobe suppression ratio (SLSR) can be attained for each passband of the frequency channelizer. The SLSR is defined as the ratio of the peak transmission efficiency in each passband relative to the transmission efficiency of the most-significant side lobe in the passband.

Variations of the invention provide methods for forming chip-scale silica-based RF-photonic spectrum analyzers with high resolutions and small footprints. In some embodiments, the invention is premised on the realization that low-loss curved (serpentine) silica waveguides can be utilized, along with photo-induced three-dimensional optical interconnects in silica. These embodiments can accomplish high-resolution channelization via the generation of a large number of filter-taps from a long, low-loss delay-line. These embodiments can also accomplish compactness via the use of stacked, multiple WG levels.

Variations of the invention provide methods for fabricating high-resolution, silica-based optical channelizers utilizing finite impulse response (FIR) filters. FIR filters can be folded into a stacked-layer device configuration. A stacked-layer device configuration has the advantage of maintaining phase stability when there are environmental perturbations.

Variations of this invention provide methods for tapping out optical power accurately from a single delay line, and distributing the optical taps to a separate waveguide level by optical interconnects. It has been discovered that co-planar directional couplers can tap power accurately from a delay-line, and that short, photo-induced three-dimensional buried optical waveguides can transfer the tapped power from a first waveguide layer to a second (preferably stacked) waveguide layer.

Certain preferred embodiments of the present invention will now be described in more detail, including reference to the accompanying figures. The figures are understood to provide representative illustration of the invention and are not limiting in their content or scale. It will be understood by one of ordinary skill in the art that the scope of the invention extends beyond the specific embodiments depicted. This invention also incorporates routine experimentation and optimization of the methods, apparatus, and systems described herein.

Figure 1:
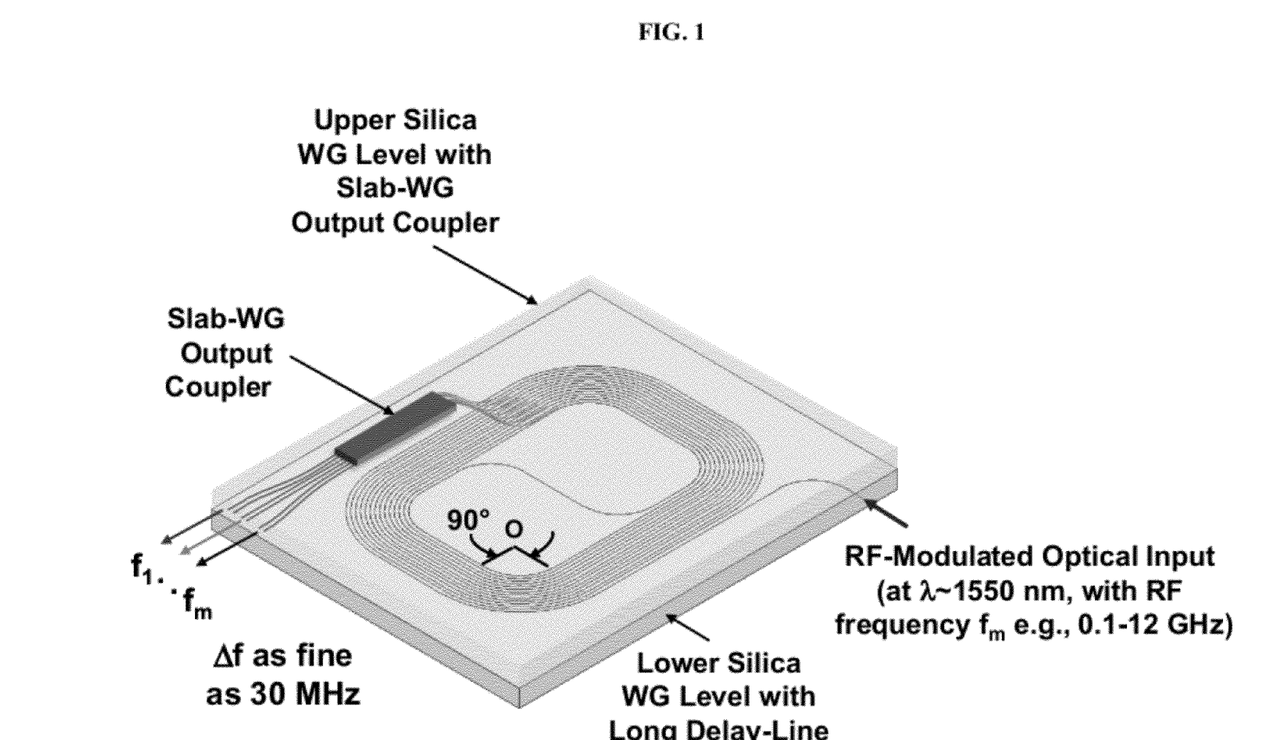
FIG. 1 is an illustration of a RF-photonic spectrum analyzer that is composed of two stacked silica waveguide layers, in accordance with some embodiments of the invention.

FIG. 1 is an illustration of a RF-photonic spectrum analyzer that is composed of two stacked silica waveguide layers. In FIG. 1, the RF-spectrum to be channelized is modulated on a silica optical carrier. The chip-scale spectrum analyzer uses high-precision filter-taps from a delay-loop (located at the bottom level) to form a FIR filter. The filter-taps feed a slab waveguide region (located at the upper level) in which the modulated optical spectrum is separated spatially via focusing. A short three-dimensional optical interconnect between the lower and upper level can be formed by controlled focusing of a laser beam, as further described below.

Reference herein to "bottom" and "upper" layers is for convenience to a typical frame of reference, as will be appreciated. Generally, a first layer is the bottom layer and a second layer is the upper layer. There can be additional layers, such as cladding material between the first and second layers. In some embodiments, a first waveguide layer is disposed substantially co-planar with a second waveguide layer.

The waveguides are not limited to silica ($SiO_2$), but silica is preferred due to certain intrinsic material attributes. In some embodiments, the waveguides consist essentially of silica. In other embodiments, the waveguides further include one or more intentional dopants, such as germanium (Ge), phosphorus (P), or titanium dioxide ($TiO_2$). Other waveguide materials that can be used include, but are by no means limited to, silicon, silicon-oxynitride, and various polymers.

A cladding must have a lower refractive index than a waveguide core for waveguiding to occur. Some embodiments employ a waveguide-core of Ge-doped silica, surrounded by silica cladding. The level of Ge doping can be about 0.5-2.5%, such as that employed in commercial devices, or some other level of Ge doping. Other dielectric waveguides can be used, including, for example, silicon nitride cladded by silica, or silicon oxynitride cladded by silica, among other possibilities as will be appreciated.

Silica waveguides have demonstrated a low loss of less than 1 dB/meter at a wavelength of 1550 nm. This low loss allows an optical carrier modulated with RF to propagate through the delay-line (at the bottom level) with minimal attenuation. Therefore, a large number ($N_t$) of optical filter-taps with a differential time-delay $t_d$ between successive filter-taps can be generated.

The passband width (PBW) or spectral region of each channel in the spectrum analyzer is given by $1/(N_t t_d)$. The PBW determines the resolution, so that a high channelization resolution can be achieved when $N_t$ is large. For example, to achieve a PBW of 30 MHz, the product ($N_t \times t_d$) is about 33 nanoseconds. Since a silica waveguide generates a time-delay of 50 psec/cm, the total length of the serpentine delay-line shown in FIG. 1 needs to be about 6.7 meters. The propagation loss of curved silica waveguides can be estimated as about 0.1 dB/meter. Silica waveguides functioning as the time-delay medium, therefore, should incur a propagation loss of only about 0.67 dB between the first and the last filter-tap points of the serpentine delay-line.

Figure 2:
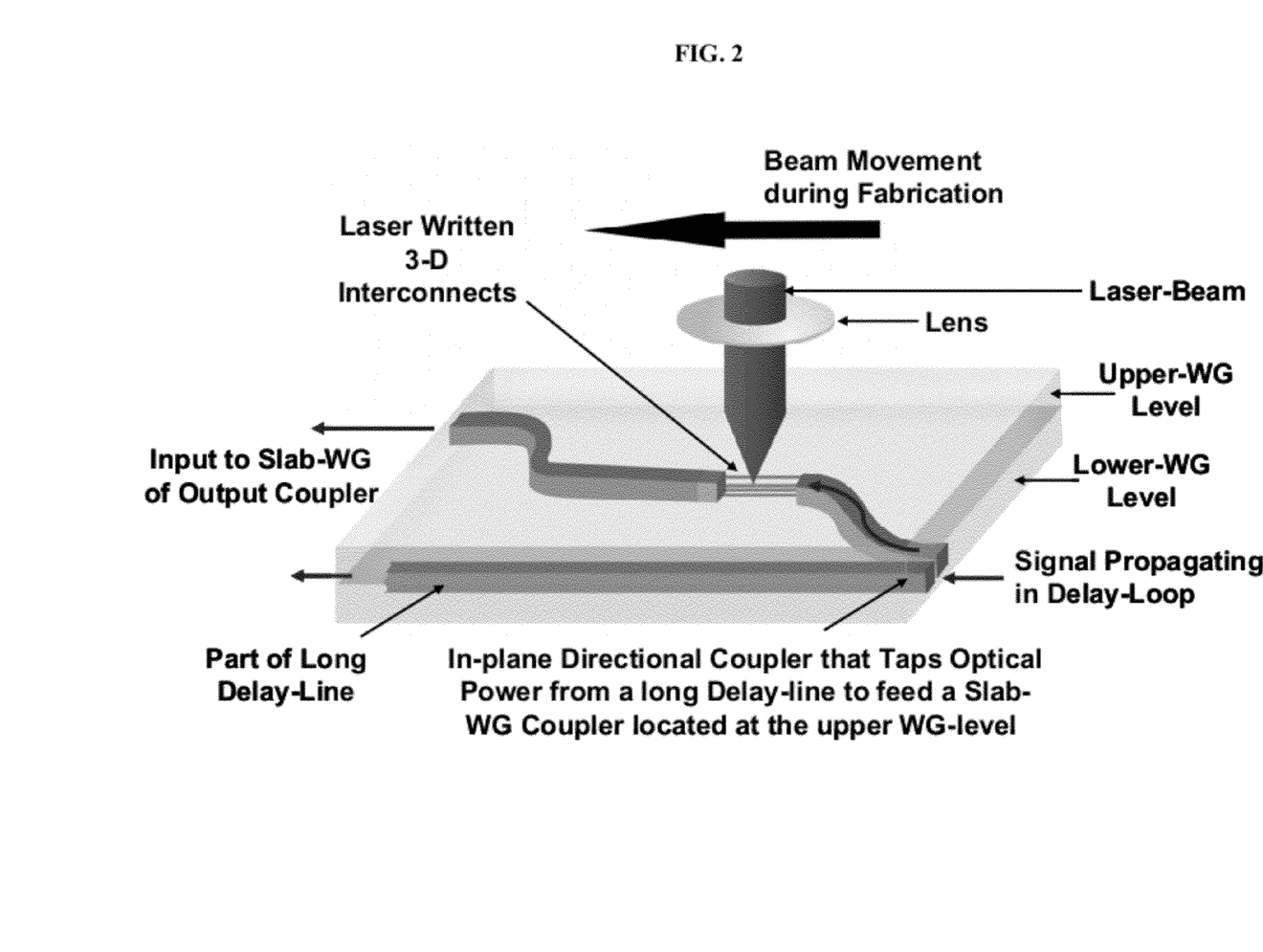
FIG. 2 is an illustration of the laser-written three-dimensional optical interconnect between the waveguide layers, according to some embodiments.

FIG. 2 illustrates the presence of a three-dimensional optical interconnect between the waveguide layers. Fabrication of such an optical interconnect can be accomplished, for example, by laser-writing to connect the output of a directional coupler located at the lower waveguide level to another waveguide located at the upper waveguide level. The upper waveguide level can be deposited by a step of chemical vapor deposition after fine chemical-mechanical polishing of an upper cladding for the lower waveguide level. This process can be easily repeated to accomplish the vertical integration of more layers on the same silicon (or other) substrate.

A preferred laser-written optical interconnect traverses from the first waveguide layer to the second waveguide layer. In preferred embodiments, optical power is first tapped in the lower waveguide level via co-planar directional couplers. Preferably, the tap-waveguide (filter-tap) in each co-planar directional coupler is fabricated simultaneously with the serpentine delay-line. This technique allows for controllable and accurate power transfer from the serpentine waveguide to a filter-tap. In preferred embodiments, the filter-taps are apodized. Apodized filter-taps generally provide smoothed discontinuities at boundaries of each filter-tap. Apodized filter-taps enhance the side-lobe suppression ratio for each channel.

After optical power is accurately tapped, a multi-dimensional optical interconnect serves to guide (i.e., transport) the tapped power from one waveguide level to another. The combination of (i) a co-planar direction coupler for power-tapping and (ii) a laser-written optical interconnect for power transfer, can provide highly accurate formation of apodized filter-taps.

To write an optical interconnect that can guide signals from the filter-taps to the slab coupler, a laser beam can be translated in a region of material between the waveguide planes (or layers, if not planar). Specifically, the focal point of a laser beam can be translated in more than one dimension (i.e., two or three dimensions) to write the optical interconnect that connects a waveguide core located at the bottom waveguide level, through the clad-layers between the two levels, and finally to another waveguide core located at the upper waveguide level. The waveguide wafer to be written can be translated, rather than the laser beam; or, some combination of movement of both laser and material can be utilized.

Because optical absorption allows energy to be transferred from the laser beam and be deposited in the bulk of a suitable material such as silica, structural changes can be produced inside the sample—via focusing—without affecting the material properties outside the focal volume. This allows three-dimensional structures to be fabricated by translating the laser focus through the sample.

Focusing of the laser beam significantly increases the peak intensity of the beam compared to an unfocused beam. The high intensity of the focused beam produces an increase in the refractive index of the sample along the path traced by the beam focus as it is translated through the sample in a predetermined region. The resulting region of increased refractive index can guide light and therefore can function effectively as an optical waveguide.

The energy intensity and wavelength of the laser beam can vary, according to this invention. For example, the laser beam that "writes" the buried silica waveguide can employ one or more electromagnetic wavelengths $\lambda$ in the range of about 157 nm to about 1045 nm. Classes of lasers suitable for waveguide writing in these methods include excimer lasers that operate in the UV, and lasers that emit fsec pulses in the near infrared (e.g., $\lambda \approx 810$ nm or $\lambda \approx 1045$ nm). Certain embodiments employ UV energy frequencies. Other embodiments employ near-IR energy frequencies.

In preferred embodiments utilizing silica, the technique of forming an optical interconnect takes advantage of silica's photosensitivity for refractive-index enhancement ($\Delta n$). The UV-sensitivity of silica fibers has been utilized extensively for the commercial manufacturing of Bragg fiber gratings (see, e.g., Hill and Meltz, *IEEE J. of Lightwave Technology*, Vol. 15, No. 8, pp. 1263-1275, 1997). It is theorized that the $\Delta n$ obtained can be due to a combination of mechanisms occurring in silica.

One mechanism for enhancing the refractive index in silica uses photoinduction. Silica can be doped with germanium, tin, boron, or some other dopant specifically for the purpose of increasing the photosensitivity for $\Delta n$. Germanium doping of silica is preferred in some embodiments. Co-doping with phosphorus and/or boron can also be employed. Additional dopant species such as tin, titanium, antimony, aluminum, and nitrogen are also expected to enhance the UV photosensitivity of silica, either through increased absorption at the writing wavelength, or through the introduction of additional UV-modifiable defects within the silica matrix.

Optionally, a silica region may be loaded with hydrogen and/or deuterium to enhance the photosensitivity of the region, as described in U.S. Pat. No. 7,440,653 to Smith et al.

In general, the properties of laser-written waveguides in silica or other materials can depend on laser-exposure conditions such as average power, peak power, repetition rate, scan speed, wavelength, pulse duration, polarization, numerical aperture, and focus depth.

Without being limited herein to any particular theory, one mechanism in Ge-doped silica includes bleaching of 240-nm absorption centers, accompanied by the simultaneous creation of new absorption centers at wavelengths less than 200 nm. Using the Kramers-Kronig relationship, one can then estimate the induction of a positive $\Delta n$ in the near infrared (see Leconte et al., *Applied Optics*, Vol. 36, No. 24, pp. 5923-5930, 1997).

Another potential mechanism relates to the occurrence of compaction (i.e., density change) following heat accumulation in UV-exposed silica (see Borrelli et al., *JOSA B*, Vol. 16, No. 10, pp. 1672-1678, 1999).

Other mechanisms that may occur include multiphoton processes at the focal point of short optical pulses generated by a laser (see Nasu et al., *Optics Letters*, Vol. 30, No. 7, pp. 723-725, 2005). An exemplary pulse is 150 femtoseconds (fs) at a wavelength of 775-810 nm, energy of 182 nJ, and 1-kHz repetition rate. The use of femtosecond laser pulses is described in Itoh et al., "Ultrafast Processes for Bulk Modification of Transparent Materials," *MRS Bulletin*, Vol. 31, August 2006.

In some variations of the present invention, it is preferable to employ femtosecond laser pulses to write the optical interconnects, because such methods are relatively independent of the silica's doping. Further, some variations employ combinations of femtosecond laser pulses with other forms of radiation.

In some embodiments, a pulsed laser beam is characterized by several beam parameters including the wavelength, pulse duration or pulse width, pulse energy, and repetition rate. For femtosecond laser beams at wavelengths $\lambda$ of 522 nm, 810 nm, or 1045 nm, multi-photon absorption is expected to occur only at the focal point (focal volume). Because nonlinear (multi-photon) absorption confines laser-material interactions tightly to the focal volume, material or refractive-index modifications in the surrounding material is minimized. This type of localized enhancement of refractive index in silica is preferred in the formation of three-dimensional optical waveguides or optical interconnects.

The time duration of each laser pulse used for photoinduction, also known as the pulse width, can vary. Exemplary pulse widths are from about 10-1000 fs, such as about 100-500 fs.

The repetition rate or pulse frequency generally falls within a range extending from about 1 kHz to about 1.5 MHz for amplified laser systems, with the higher rates generally preferred.

The energy per pulse, or pulse energy, is not particularly limited but can be, for example, selected from about 0.1 µJ to about 100 µJ or higher. In silica-based materials, preferred pulse energies can be on the order of 0.1 to several µJ, depending on the repetition rate.

A suitable focusing lens includes a microscope objective having a magnification power of about 5× to about 20×, for example. The focusing lens can have a numerical aperture (NA) between about 0.1-0.5, preferably greater than about 0.2 to increase the intensity of the focus and avoid distortion of the resulting waveguide shape. An exemplary focusing lens is an aspheric lens for achieving a diffraction-limited spot size of the focused laser beam.

Selection of the laser source used for photoinduction, in various embodiments, can include one or more of the following factors: proximity of the source wavelength to the peak of the absorption band in the material; good coherence length of the laser source; good beam-pointing stability; and economic considerations (i.e., cost of laser source).

In various embodiments, suitable UV lasers used for photoinduction include pulsed excimer-based sources such as KrF (248.5 nm), ArF (193 nm), and $F_2$ (157 nm). Also, a pulsed excimer-pumped frequency-doubled dye laser or a pulsed frequency-doubled optical parametric oscillator can be considered. Suitable femtosecond lasers include amplified Ti:sapphire lasers ($\lambda \approx 810$ nm), and amplified Yb-fiber lasers ($\lambda \approx 1045$ nm). In addition, a Yb-fiber laser can be frequency-doubled to a wavelength of 522 nm, so that the range of waveguide writing conditions can be expanded.

An exemplary femtosecond laser system for writing waveguides through photoinduction is as follows. A laser system delivering approximately 1045-nm pulses can be formed from a Yb:fiber laser mode-locked at 40 MHz. The mode-locked laser can then be cascaded with a Yb:fiber pre-amplifier, followed by a large mode-area Yb-fiber power amplifier in the final stage. The pulse repetition rate can be controlled with an acousto-optic downcounter (between the pre-amplifier and power amplifier) stages to rates that range from 100 kHz to 5 MHz. In some embodiments, a second harmonic at 522 nm is generated with use of a BBO nonlinear crystal.

A sample of material into which an optical interconnect is to be written is arranged such that the light spot is positioned within a region of photosensitivity in the sample. The sample is supported on a translation stage which is operable to move the sample with respect to the light spot, so that the spot moves through the photosensitive region and causes a refractive-index increase in a desired configuration. Using a mode-locked Yb-fiber emitting at a wavelength of 1045 nm, the sample can be written transversely to the laser beam at scanning speeds that range from 1 to 100 mm/sec with use of computer-controlled motion stages. A control unit, such as a computer processor, is connected to the translation stage, and permits the pulsed output of light to be synchronized with movements of the translation stage and hence the sample.

To achieve precise and accurate waveguide writing, the alignment of the light spot within the sample should be carefully controlled during writing to ensure that it remains in the photosensitive region. Preferably, the precision of the position of the focal point relative to the photosensitive region is accurate to within the Rayleigh range of the focused beam.

Translation of the sample with respect to the focal point can be accomplished by a positioning or translation device, such as a computer-controlled XYZ stage. The translating device can be any device capable of translating the sample with respect to the beam focus at the translation speeds of interest. Preferably, the translation speed lies in the range of about 1-500 µm/s or faster.

In some embodiments, the focal point of the laser can be monitored through the same lens as that used for focusing the laser. Other known techniques to monitor the position of the focal point can be employed, as will be appreciated.

Multi-dimensional optical interconnects, as described herein, enable the formation of a multi-layer RF-photonic frequency-channelization apparatus with a small footprint. The multi-dimensional optical interconnects can also provide accurate power transfer for each filter-tap from the low-loss waveguide in the bottom layer to the slab waveguide coupler in the upper layer.

The slab waveguide coupler is typically formed as a core on a substrate (e.g., Si) and covered in a cladding material. Flame Hydrolysis Deposition (FHD) or Chemical Vapor Deposition (CVD) fabrication processes can be used, as is known. In general, the core region has a higher refractive index than the cladding region.

Figure 3:
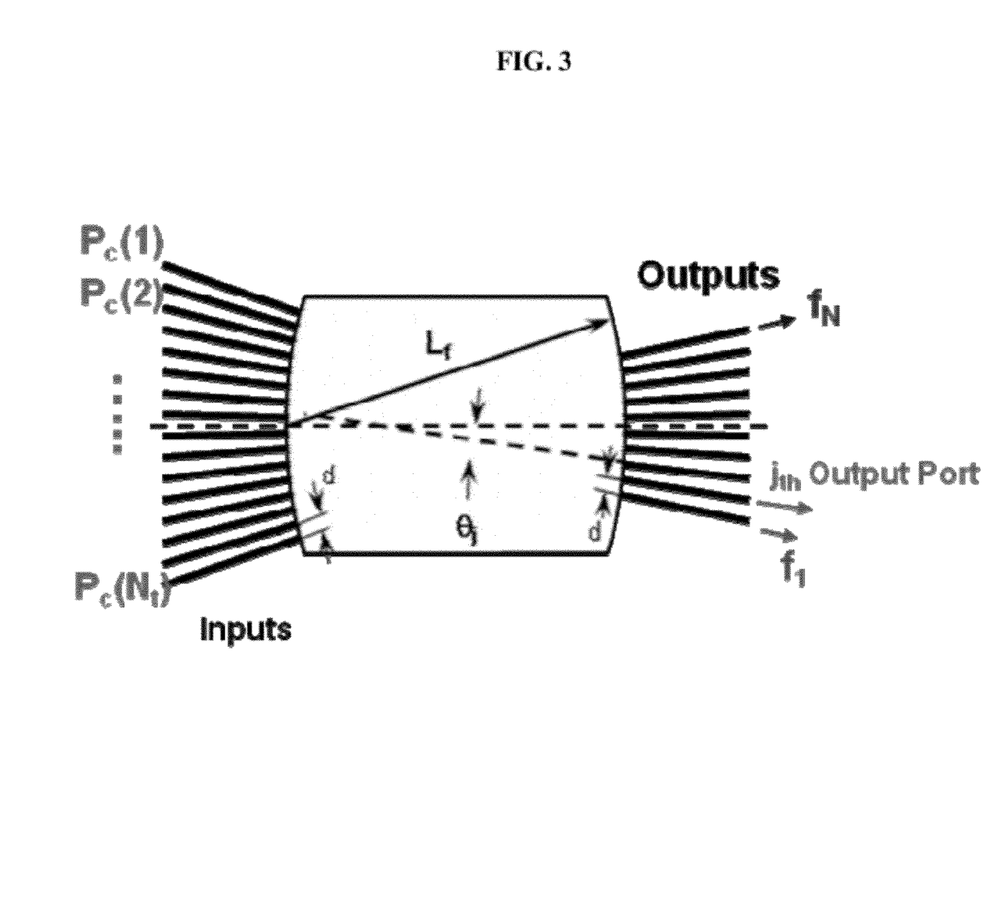
FIG. 3 is a schematic of an exemplary slab waveguide output coupler region located on a second waveguide level.

Methods for achieving accurate power transfer will now be further described, including reference to FIG. 3 which should not be construed to limit the invention. To form a passband with high SLSR, optical power must be tapped accurately from the waveguide to feed the input arc of the slab coupler region. The optical power tapped at each filter-tap is shown as $P_c(1), P_c(2), \ldots P_c(N_t)$ in FIG. 3, which is a schematic of the slab waveguide output coupler region.

As shown in FIG. 3, $N_t$ tapped delay-lines, each with a differential length $\Delta L$ between its neighbors, are fed into an output slab coupler region with radius $L_f$. If the signal to be demultiplexed is introduced to the central port of the input coupler, then the wavelength $\lambda_j$ is "focused" onto the $j^{th}$ output port when the following ($m^{th}$-order) constructive-interference condition is satisfied: $n_{eff} \Delta L + n_{eff} d \sin(\theta_j) = m \lambda_j$ where d is the arc-distance between the output-ports, $n_{eff}$ the effective refractive index of the guided mode, and $\Delta L$ the physical distance between adjacent taps in the low-loss waveguide (located at the bottom level). From this equation, it can be shown that $mL_f = n_{eff} d^2 / \Delta \lambda$, where $\Delta \lambda$ is the wavelength separation between adjacent channels. Since m is related to the free spectral range (FSR) of the demultiplexer by m=f/FSR, where f is the optical frequency of light at 1550 nm, a skilled artisan can determine m and hence the radius of the slab-coupler $L_f$ once the port-separation d and the FSR=$t_d^{-1}$ (e.g., FSR=12 GHz) are set.

Figure 4:
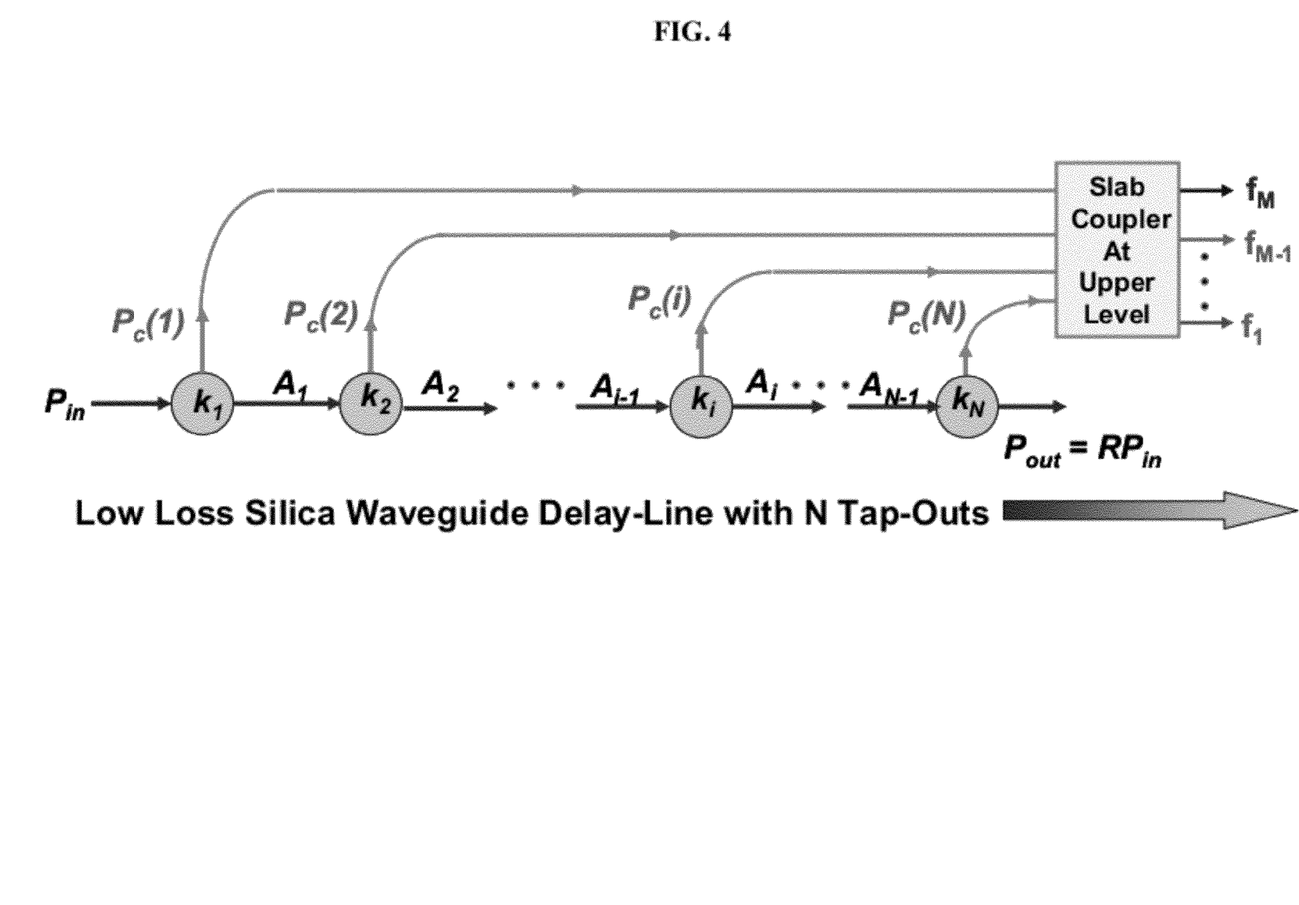
FIG. 4 is a signal-processing block diagram of the RF-photonic frequency channelizer, according to some embodiments of this invention.

FIG. 4 illustrates a signal-processing block diagram of the RF-photonic frequency channelizer according to some embodiments of this invention. It is noted that in accordance with the present invention, the $N_t$ filter-taps for the FIR filters do not arise from distinct delay-arms. Rather, the $N_t$ filter-taps are tapped out from a single, low-loss delay-line located at the bottom (first) waveguide level. The tap amplitude $k_i$ (see FIG. 4) is controlled by the power splitting enabled by a co-planar directional coupler formed in the same lower waveguide layer as the low-loss delay-line. By designing the coupling length of the co-planar directional coupler for each tap $P_c(i)$, $k_i$ can be set to a predetermined value to form the desired FIR filter response. High-resolution frequency channelization arises because a plurality of filter-taps all originate from a single, low-loss optical waveguide. The invention is not particularly limited to a certain range of values for $N_t$, but in variations $N_t$ is at least 100, 200, 300, 400, 500 or more.

Certain variations of the invention provide a chip-scale, high resolution (e.g., 30-100 MHz) RF-photonic spectrum analyzer. The wavelength of the optical carrier is preferably small, such as about 1550 nm. The RF-photonic spectrum analyzer formed can be compact.

For example, a RF-photonic spectrum analyzer is contemplated that is characterized by $N_t$=400, PBW=30 MHz, FSR=12 GHz (240 channels as output ports), and $L_f$=1.5 cm, using a delay-line that is about 6.6 meters long. Such an apparatus is capable of channelizing a 12 GHz signal modulated on a 1550-nm carrier into 30-MHz channels ($f_1, f_2, \ldots, f_M$) using a silica-waveguide chip that is only about 10 cm² in footprint. The photodetected signal will reveal the presence or absence of signatures in the frequency bin $f_j$ (j=1 ... M) picked up by the incident optical carrier.

Figure 5:
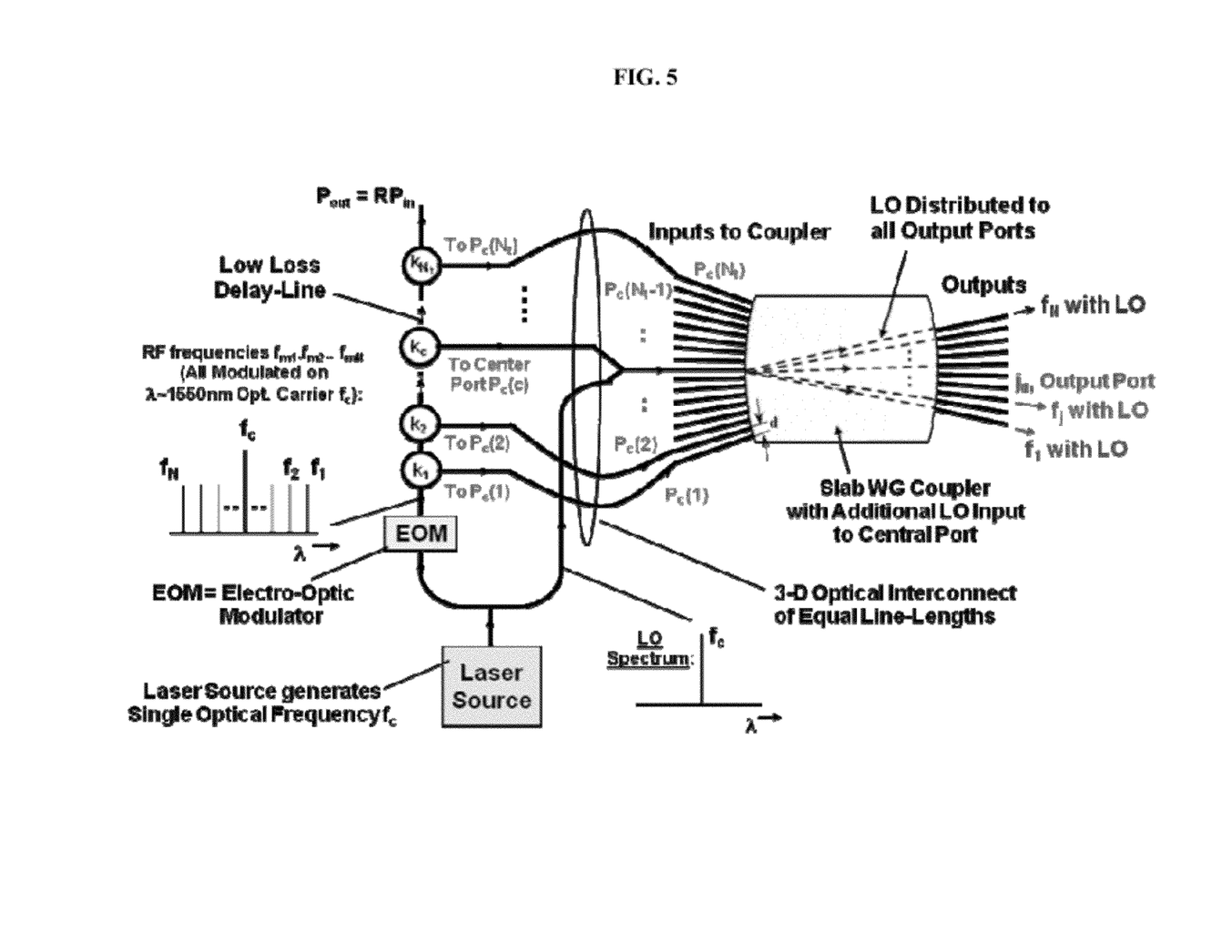
FIG. 5 is a schematic of an embodiment that shows the feeding of a local oscillator (LO) signal to a slab coupler, so that channelized RF-modulation can be directly recovered (after photodetection) at each output port of the slab coupler.

Optionally, a local-oscillator (LO) arm can be added to the chip so that the original RF-modulation (at RF frequency $f_{mj}$, j=1 ... N) can be recovered directly from the photodetected outputs of the chip (see FIG. 5). Without the local oscillator, the presence of a modulation sideband (e.g., located at an optical frequency $f_j$) can be photodetected as a DC signal. If a coherent optical carrier (with no modulation sidebands, but from the same laser) is fed into the central input port of the slab coupler, it will be symmetrically distributed with equal phase to all output ports of the coupler. When this optical carrier is heterodyned (via photodetection) with the modulation sideband directed to the $j^{th}$ output port of the slab coupler, one can obtain an RF photocurrent at RF-frequency $f_{mj}$ that corresponds to the $j^{th}$ modulation sideband of the optical input fed to the chip-scale channelizer shown in FIG. 1.

RF-frequency channelizers can be used in a variety of microwave systems designed for radar, communication, or electronic-warfare applications. By channelizing a received RF signal, digital signal processing algorithms can be carried out to process a signal that lies over a narrower frequency segment. In addition, weak received signals can be analyzed with sufficient signal-to-noise ratios. In electronic-warfare applications, channelization is typically utilized to improve the signal-to-noise ratio of a weak RF emission for detection and identification. The small form-factor (physical size) of the high-resolution RF-photonic spectrum analyzer of the invention offers substantial utility for defense deployment.

The frequency channelizers disclosed herein can also be utilized in wavelength division multiplexed telecommunication networks to help accomplish practical, high-speed wavelength add/drop. Wavelength division multiplexing (WDM) is the process of carrying light of multiple wavelengths within a fiber. The fiber can carry the several channels without interference. WDM combines multiple optical signals so that they can be amplified as a group and transported over a single fiber to increase capacity. At the receiving end of the fiber, the information carried on the several channels is taken off of the fiber and separated into its several channels and recombined based upon destination.

In this detailed description, reference has been made to multiple embodiments and to the accompanying drawings in which is shown by way of illustration specific exemplary embodiments in which the invention may be practiced. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are hereby incorporated by reference herein in their entirety as if each publication, patent, or patent application were specifically and individually put forth herein.

The embodiments, variations, equations, and figures described above should provide an indication of the utility and versatility of the present invention. Of course, many more devices can be developed that involve combinations of device elements as provided herein. Other embodiments that do not provide all of the features and advantages set forth herein may also be utilized, without departing from the spirit and scope of the present invention. Such modifications and variations are considered to be within the scope of the invention defined by the appended claims.

What is claimed is:

1. An apparatus for frequency channelization, said apparatus comprising:
   (a) an input for receiving a multi-frequency optical signal and a single delay-line for propagating said optical signal;
   (b) a first waveguide layer comprising a first waveguide and a second waveguide layer comprising a second waveguide;
   (c) in said first waveguide layer, a plurality of filter-taps from said single delay-line;
   (d) in said second waveguide layer, a slab waveguide coupler with output ports for spatially separating signals from said filter-taps; and
   (e) an optical interconnect traversing from said first waveguide layer to said second waveguide layer, wherein said optical interconnect guides signals from said filter-taps to said slab waveguide coupler.

2. The apparatus of claim 1, wherein said first waveguide layer and said second waveguide layer are substantially co-planar.

3. The apparatus of claim 1, wherein said first waveguide exhibits a loss of less than 1 dB/m at a wavelength of 1550 nm.

4. The apparatus of claim 1, wherein said first waveguide consists essentially of silica, optionally with one or more dopants.

5. The apparatus of claim 1, wherein said second waveguide consists essentially of silica, optionally with one or more dopants.

6. The apparatus of claim 1, wherein said first and second waveguides are of different compositions.

7. The apparatus of claim 1, wherein said filter-taps include in-plane directional couplers.

8. The apparatus of claim 1, wherein said filter-taps provide differential phase-shifts from a single, serpentine delay-line.

9. The apparatus of claim 1, wherein said filter-taps are apodized.

10. The apparatus of claim 1, wherein said optical interconnect is formed by a laser beam.

11. The apparatus of claim 10, wherein said laser beam is in the UV region.

12. The apparatus of claim 10, wherein said laser beam is in the near-IR region.

13. The apparatus of claim 1, further comprising at least one additional waveguide layer.

14. An apparatus for frequency channelization, said apparatus comprising:
   (a) an input for receiving a multi-frequency optical signal and a single delay-line for propagating said optical signal;
   (b) a first waveguide layer comprising a first waveguide and a second waveguide layer comprising a second waveguide;
   (c) in said first waveguide layer, a plurality of filter-taps from said delay-line;
   (d) in said second waveguide layer, a slab waveguide coupler with output ports for spatially separating signals from said filter-taps; and
   (e) an optical interconnect traversing from said first waveguide layer to said second waveguide layer, wherein said optical interconnect guides signals from said filter-taps to said slab waveguide coupler,
   said apparatus comprising a sufficient number of filter-taps whereby said multi-frequency optical signal is resolved into a plurality of spectral regions of about 100 MHz or less.

15. The apparatus of claim 14, said apparatus comprising a sufficient number of filter-taps whereby said multi-frequency optical signal is resolved into a plurality of spectral regions of about 50 MHz or less.

16. The apparatus of claim 14, said apparatus comprising a sufficient number of filter-taps whereby said multi-frequency optical signal is resolved into a plurality of spectral regions of about 30 MHz or less.

17. The apparatus of claim 14, wherein said first waveguide exhibits a loss of less than 1 dB/m at a wavelength of 1550 nm.

18. The apparatus of claim 14, wherein said first waveguide consists essentially of silica, optionally with one or more dopants.

19. The apparatus of claim 14, wherein said optical interconnect is formed by a laser beam.

20. The apparatus of claim 14, further comprising a local-oscillator arm for feeding a local-oscillator signal with no RF-modulation into the center input port of said slab waveguide coupler.

21. The apparatus of claim 20, wherein said local-oscillator arm distributes said local-oscillator signal to said output ports to recover the original RF-modulation from a plurality of output ports of said slab waveguide coupler.

22. A method for channelizing an input optical signal, said method comprising:

(a) receiving a multi-frequency optical signal and propagating said optical signal onto a single delay-line in a first layer;
(b) tapping optical power from said delay-line at a plurality of filter-taps, each filter-tap comprising a co-planar directional coupler in said first layer; and
(c) guiding, through a photo-induced optical interconnect, optical power tapped in step (b) to a slab waveguide coupler in a second layer, wherein said slab waveguide coupler includes output ports.

23. The method of claim 22, wherein said filter-taps are fabricated simultaneously with said delay-line.

24. The method of claim 22, wherein said filter-taps are apodized.

25. The method of claim 22, wherein said optical interconnect is formed by translating a focal point of a laser beam from a filter-tap to a slab waveguide coupler, thereby generating a region with increased optical refractive index.

26. The method of claim 22, wherein said plurality of filter-taps is sufficient to resolve said multi-frequency optical signal into a plurality of spectral regions of about 50 MHz or less.

27. The method of claim 26, wherein said plurality of filter-taps is sufficient to resolve said multi-frequency optical signal into a plurality of spectral regions of about 30 MHz or less.

28. The method of claim 22, further comprising introducing a local-oscillator signal at the center port of the input arc of said slab waveguide coupler to recover by photodetection, the RF-modulation of said input optical signal.

* * * * *